United States Patent [19]

Schwartz

[11] Patent Number: 5,302,566
[45] Date of Patent: Apr. 12, 1994

[54] PROCESS FOR PREPARING ATTRITION RESISTANT CATALYSTS

[75] Inventor: Jo Ann T. Schwartz, Chadds Ford, Pa.

[73] Assignee: E. I. Du Pont de Nemours and Company, Wilmington, Del.

[21] Appl. No.: 27,721

[22] Filed: Jan. 25, 1993

[51] Int. Cl.⁵ ............... B01J 35/08; B01J 27/18; B01J 27/182; B11J 21/12
[52] U.S. Cl. ............................ 502/8; 502/10; 502/209; 502/232
[58] Field of Search ............... 502/8, 9, 10, 209, 232

[56] References Cited

U.S. PATENT DOCUMENTS 4,677,084  6/1987  Bergna ........................ 502/8

Primary Examiner—Paul E. Konopka

[57] ABSTRACT

A process is described for preparing attrition resistant catalyst, particularly vanadium/phosphorus oxide catalyst, having an oxide rich surface layer. The oxide rich surface layer is obtained from a stable oxide-forming mixture which contains both colloidal oxide sol and a soluble oxide precursor.

4 Claims, 1 Drawing Sheet

1 ○ 100% PSA + VPO
2 ◇ 100% PSA + VPO
3 ● 95% LUDOX® FM, 5% PSA + VPO
4 □ 95% LUDOX® FM, 5% PSA + VPO
5 △ 100% LUDOX® FM + VPO

PROCESS FOR PREPARING ATTRITION RESISTANT CATALYSTS

FIELD OF THE INVENTION

The invention relates to an improved process for preparing an attrition resistant catalyst by the steps of forming a slurry which contains particles, spray drying the slurry, and calcining and activating the spray dried product.

BACKGROUND OF THE INVENTION

Preparation of attrition resistant, silica-containing catalysts by the steps of forming a slurry, spray drying the slurry, and calcining and activating the resulting spray-dried microspheres is known in the art. Prior art procedures have involved combining the silica component, in the form of a solution or colloidal sol, with catalyst, catalyst precursor, or catalyst support to form a slurry. The slurry is then spray dried and calcined and activated to form the catalyst. The silica component, which functions as a binder, is normally dispersed throughout the particles.

U.S. Pat. No. 4,677,084 to Bergna discloses an improvement in the process of preparing attrition resistant catalysts, in particular mixed oxide catalysts of vanadium and phosphorus (V/P/O) which are used in the oxidation of hydrocarbons. A solution of oxide precursor, such as polysilicic acid, is used to form an oxide shell over particles of catalyst, catalyst precursor or catalyst support. The process includes the steps of forming a slurry of the catalyst, catalyst precursor, or catalyst support particles with a solute of the oxide precursor (polysilicic acid) having a particle size of not greater than 5 nm, spray drying, and calcining. The amount of solute and particles are selected such that the oxide shell which forms comprises 3-15% by weight of the total weight of particles and oxide. The Bergna patent illustrates that a V/P/O catalyst product prepared using polysilicic acid as the oxide source is superior in terms of attrition resistance to a V/P/O catalyst prepared using colloidal silica as the oxide source.

Although the process and product improvements realized using polysilicic acid (PSA) as oxide source in a V/P/O catalyst in accordance with the Bergna teaching are substantial, a significant problem is associated with the use of polysilicic acid as oxide source. Polysilicic acid is normally made by deionizing a sodium silicate solution. Upon deionizing, the polysilicic acid immediately begins to polymerize and ultimately a gel is formed. When the polysilicic acid solution has gelled, it becomes intractable and cannot be further processed. In practice it has been found that the polysilicic acid is less suitable for processing after a relatively short time, and that preferably a PSA/VPO precursor slurry must be entirely spray dried within 3–4 hours after the PSA solution is generated. This places a significant constraint on the process when it is scaled up to commercial production levels.

SUMMARY OF THE INVENTION

It has been found that the process of preparing attrition resistant, silica-containing catalysts, in particular V/P/O oxidation catalysts, is improved by using as the oxide source a combination of oxide precursor solution and a colloidal oxide of defined particle size. The process comprises the steps of forming a slurry of catalyst particles or catalyst precursor particles with a mixture consisting essentially of, in combination: a) a colloidal oxide sol, the sol containing particles of average diameter of 5–7 nm, and b) a solution of oxide precursor, followed by spray drying, calcining and activating. The resulting catalyst is comparable in attrition resistance properties to a catalyst made using only oxide precursor solution as the oxide source. The mixture of combined oxide precursor solution and colloidal oxide, however, is significantly more stable than a solution of oxide precursor alone, and the combined mixture can be stored or held for many more hours, or even days, before use.

Thus the present invention provides a process for preparing attrition resistant catalyst having an oxide rich surface layer, comprising:

A) forming a slurry from
  i) catalyst or catalyst precursor particles; and
  ii) an oxide-forming mixture consisting essentially of
    a) a colloidal oxide sol, the oxide particles in the sol having an average size of between 5 and 7 nm; and
    b) a solution of soluble silicon oxide precursor, wherein the relative amounts of sol a) and solution b) being selected such that from 50 to 95 percent of the weight of the oxide rich surface is from the colloidal oxide sol and from 50 to 5 percent of the weight of the oxide rich surface is from the soluble silicon oxide precursor and wherein the relative amounts of particles i) and mixture ii) being selected such that the weight of the oxide rich surface layer is between 3 and 15% by weight of the total weight of the particles and oxide rich surface layer;

B) spray drying the slurry from step A) to form porous microspheres; and

C) calcining and activating the spray dried microspheres.

Preferably the catalyst is a V/P/O-SiO$_2$ attrition resistant catalyst, the colloidal sol is a silica sol, and the oxide precursor solution is polysilicic acid containing less than 6% by weight SiO$_2$.

DESCRIPTION OF THE PREFERRED EMBODIMENTS

Figure 1:
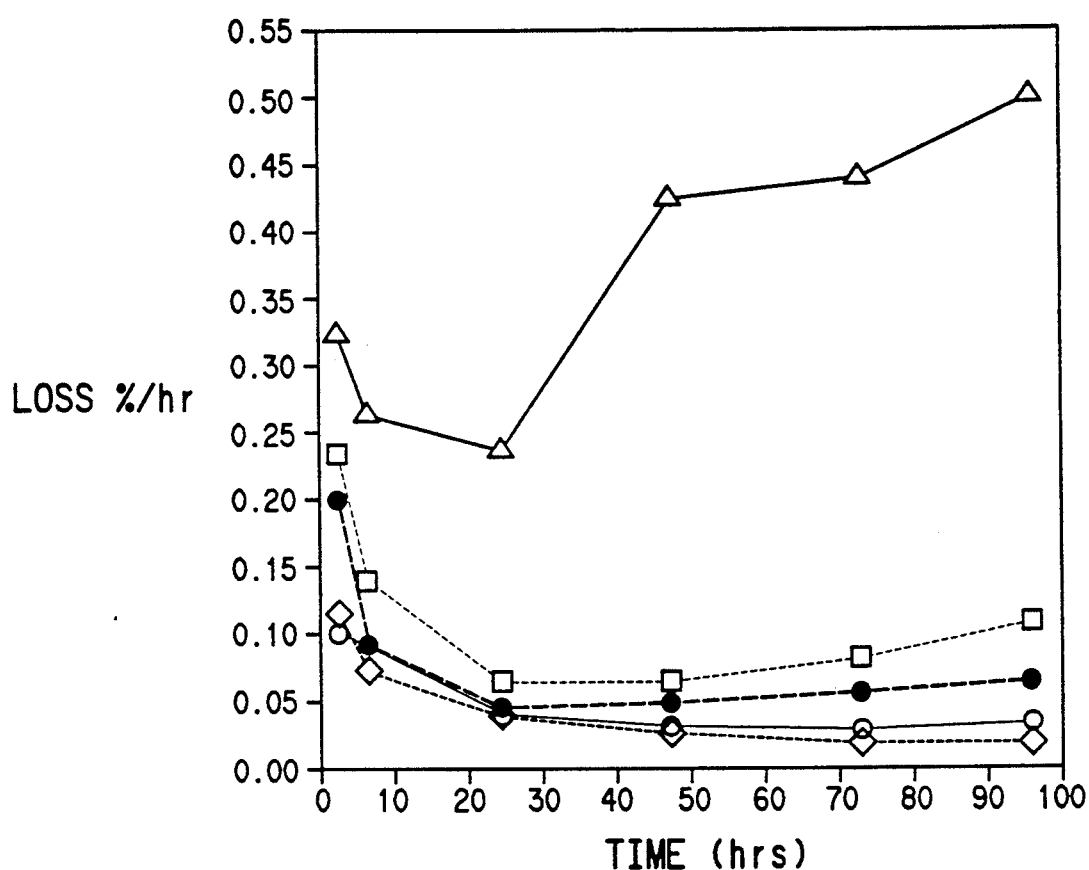
FIG. 1 shows the results of attrition mill tests comparing V/P/O catalysts, each containing 10% w/w silicon oxide, prepared by the techniques described herein, using as SiO$_2$ source: 100% Ludox ® FM colloidal silica (open triangles); 100% PSA solution (open diamonds and open circles); and combined 95% Ludox ® FM and 5% PSA solution (closed circles and open squares). Weight loss percent per hour is plotted against time in hours.

The process described herein is technologically related to the process described in U.S. Pat. No. 4,677,084, the full disclosure of which is incorporated by reference herein. As set forth therein, many types of attrition resistant catalysts, including silica-containing catalysts, are known in the art. Of particular interest herein is a mixed oxide catalyst of vanadium and phosphorus V/P/O catalyst used in the conversion of hydrocarbons such as butane to maleic anhydride. For that reason, the following disclosure will focus on V/P/O catalysts as representing a particularly preferred embodiment, but the invention is not limited thereto, and preparation of other catalysts of the type described in U.S. Pat. No. 4,677,084 may benefit from the process improvement disclosed herein.

The process of the invention relates to the preparation of attrition resistant catalysts comprising the steps of:

A) forming a slurry comprising:
  i) catalyst precursor particles or catalyst particles; and
  ii) an oxide-forming mixture consisting essentially of:
    a) a colloidal oxide sol, the oxide particles in the sol having an average particle diameter of about 5-7 nm;
    b) a solution of soluble oxide precursor, the relative amounts of particles i) and solution ii) being selected such that the weight of the oxide shell formed in the subsequent steps is between 3 and 15% by weight, preferably about 10% by weight, of the total weight of the particles and the oxide formed;
B) spray drying the slurry to form porous microspheres of catalyst or catalyst precursor; and
C) calcining and activating the spray dried microspheres at an elevated temperature which is below the temperature which is substantially deleterious to the catalyst, to form attrition resistant catalyst having an oxide-rich surface layer.

Spray drying and calcining and activating steps B) and C) are known to those skilled in the art and can be carried out similarly to the disclosure in U.S. Pat. No. 4,677,084, or as described in the Example herein.

Particles suitable for the catalyst/catalyst precursor particles i) are described in U.S. Pat. No. 4,677,084, and preferably comprise V/P/O catalyst precursor particles having a diameter of 0.5 to 10 microns, preferably 0.5 to 3 microns.

The soluble oxide precursor solution is preferably aqueous polysilicic acid. Preparation of polysilicic acid solution from aqueous sodium silicate solution, and deionization of the solution using ion exchange resin, is described in U.S. Pat. No. 4,677,084.

In accordance with the invention, the mixture ii) contains, in combination, both a colloidal oxide sol, preferably a silica sol, the particles in the sol having a diameter (average) of about 5-7 nm, and a solution of soluble oxide precursor, preferably polysilicic acid having a $SiO_2$ content of not greater than 6%.

The colloidal silica sol may be a commercially available material, such as those available under the trade names Ludox® FM (average particle size 5 nm) or Ludox® SM (average particle size 7 nm). These colloidal sols are stable, and have little or no tendency to gel. As normally available, the particles in the sol have sodium ions on the surface as stabilizing counter ions. The sodium ions are preferably removed (by ion exchange resin) before the sol is combined with the PSA solution to form mixture ii).

The colloidal sol and PSA solution may be combined in various proportions to form mixture ii). As noted, the total oxide derived from mixture ii) in the final catalyst is 3-15% w/w. Up to about 95% by weight of that oxide may be derived from the colloidal sol, and as little as about 5% by weight from the PSA solution (soluble silica). Preferably, 5 to 50% of the oxide layer is derived from soluble silica, and 50 to 95% of the oxide layer is derived from the colloidal sol, in each case by weight.

Accordingly, in a preferred embodiment of the invention wherein the catalyst is a V/P/O oxidation catalyst, the amounts of V/P/O precursor particles i) and mixture ii) are calculated such that the oxide shell layer is 3-15% w/w of the catalyst product, and the amounts of silica sol a) and PSA solution b) are calculated such that 5-50% by weight of the oxide is derived from soluble silica.

As shown in FIG. 1, it is critical to catalyst attrition resistance that at least some of the oxide layer is derived from soluble silica. A catalyst wherein the oxide layer is derived entirely from colloidal silica (Ludox® FM) exhibits unsatisfactory attrition resistance. A catalyst wherein the oxide is derived from both colloidal silica and very little soluble silica, however, exhibits a very desirable level of attrition resistance fully comparable to the attrition resistance associated with catalysts prepared using entirely soluble silica. It has surprisingly been found that replacing 50 to 95% of the soluble silica (PSA) with colloidal silica results in formation of an essentially equivalent oxide shell which forms as the spray-dried droplets form microspheres, provided the size of the particles in the colloidal sol is not greater than about 7 nm, and is preferably, as stated above, of an average diameter or size of about 5-7 nm. The morphology of the resulting attrition resistant catalyst, i.e. the oxide being deposited as an outer shell, is similar to catalyst produced using soluble silica as the sole source of oxide.

The mixture ii) containing colloidal sol and oxide precursor (PSA) solution is considerably more stable than the oxide precursor solution alone, which, as noted, tends to gel rapidly. Gelling is indicated by, inter alia, increased viscosity. In a series of experiments a Haake RV 20/M5 viscometer was used to measure shear stress as a function of shear rate. Due to the design of this viscometer it functions as an absolute viscometer and provides for a very complete flow behavior profile for fluids. Once a flow curve (shear stress versus shear rate) has been generated using the RV 20/M5, apparent viscosity can be calculated for any shear rate point by dividing the measured shear stress by the shear rate. Thus, apparent viscosity versus shear rate can be plotted to illustrate how apparent viscosity changes as a function of shear rate.

In a number of comparisons, apparent viscosity was plotted against shear rate to illustrate the increased stability of the combined mixtures ii) with and without VPO when compared to PSA mixtures with and without VPO. The stability of colloidal sol/PSA mixtures, combined at different proportions within the ranges disclosed herein, was assessed after storage for various time periods and was found to be comparable to that of freshly-prepared PSA solutions. A 95/5 w/w mixture of Ludox® FM/PSA, after 5 days storage, showed a viscosity profile very similar to that of a freshly-prepared solution of 5% by weight PSA (stored 30 minutes), whereas the PSA solution gelled and was intractable after 22 hours of storage. Mixtures of Ludox® FM/PSA prepared at 70/30 and 50/50 proportions by weight, without added precursor particles, underwent no significant change in viscosity profile following storage for 71 hours.

Results were similar when mixtures containing V/P/O precursor particles were assessed in the same way. For example, mixtures of Ludox® FM/PSA prepared in different ratios (95/5, 70/30 and 50/50) which contained added V/P/O precursor particles showed no significant gelling after 46 hour storage, unlike the all PSA-VPO slurry which was partially gelled at 26 hours and fully gelled at 48 hours. The increased stability of the mixtures of the invention provides a distinct processing advantage when the process is carried out on a large scale.

The invention will be illustrated by the following example, which is intended to illustrate and not to limit the invention.

EXAMPLE

An attrition resistant V/P/O catalyst having a shell of $SiO_2$, the shell being 10% by weight of the catalyst and the shell being derived from colloidal silica (95% w/w) and from soluble silica (5% w/w), is prepared as follows.

To 2500 g of colloidal silica sol having an average particle size of 5 nm (Ludox® FM; Du Pont) was added 5000 g of distilled water, forming a sol containing 5% by weight colloidal silica ($SiO_2$). After stirring for 10 minutes, the measured pH was 10.35. A strongly acidic sulfonic acid cation exchange resin (Dowex HCR-W2-H) was added, with stirring, until the pH was 2.79. The deionized Ludox® FM was then separated from the resin by filtration.

A 5% by weight sodium silicate solution was prepared by diluting sodium silicate (JM grade; Du Pont) with distilled water. The pH of the solution was lowered to 2.93 by addition of Dowex HCR-W2-H resin, and the resin was removed by filtration.

The catalyst precursor particles employed were milled hydrogen vanadyl phosphate having a mean particle diameter $d_{50}$ of 1.22 microns.

A slurry was prepared from 1000 g of the milled V/P/O precursor particles, 2111 g of the deionized Ludox® FM, and 111 g of the 5% by weight PSA solution, by mixing the components together to form a slurry. The slurry was spray-dried on a Bowen No. 1 Tower Pilot Plant spray drier. Calcination and activation was carried out in the following manner: 1.5 kg of spray dried VPO was loaded into a 3.5 inch diameter fluid bed. The 1.5 kg of VPO was fluidized with air and heated to 390° C. The bed was held at 390° C. for one hour. After this calcination step, the VPO was activated with 1.5% butane at 460° C. for approximately 14 hours.

Attrition resistance of the resulting catalyst was assessed in an attrition mill of the type described in U.S. Pat. No. 4,677,084. For comparison, comparable catalysts prepared using only colloidal silica or only soluble silica as the oxide source were also tested, and the results are shown in FIG. 1. The results reflect that the catalysts prepared according to the invention have attrition resistance properties which are comparable to catalysts prepared using only soluble silica as the oxide source.

What is claimed is:

1. A process for preparing attrition resistant catalyst having an oxide rich surface layer, comprising:
   A) forming a slurry from
      i) catalyst or catalyst precursor particles; and
      ii) an oxide-forming mixture consisting essentially of
         a) a colloidal oxide sol, the oxide particles in the sol having an average size of between 5 and 7 nm; and
         b) a solution of soluble silicon oxide precursor,
      wherein the relative amounts of sol a) and solution b) being selected such that from 50 to 95 percent of the weight of the oxide rich surface is from the colloidal oxide sol and from 50 to 5 percent of the weight of the oxide rich surface is from the soluble silicon oxide precursor and wherein the relative amounts of particles i) and mixture ii) being selected such that the weight of the oxide rich surface layer is between 3 and 15% by weight of the total weight of the particles and oxide rich surface layer;
   B) spray drying the slurry from step A) to form porous microspheres; and
   C) calcining and activating the spray dried microspheres.

2. The process of claim 1, wherein the attrition resistant catalyst is a vanadium/phosphorus oxide (V/P/O)-$SiO_2$ catalyst, the particles i) are V/P/O precursor particles having a particle size of 0.5 to 3 microns, the colloidal oxide sol a) is a colloidal silica sol having an average particle diameter of 5-7 nm, and the soluble oxide precursor is a polysilicic acid solution containing less than or equal to 6% by weight $SiO_2$.

3. The process of claim 1, wherein the oxide surface layer is about 10% by weight of the attrition resistant catalyst.

4. The process of claim 2, wherein the oxide surface layer is about 10% by weight of the attrition resistant catalyst.

* * * * *